March 4, 1952
A. K. MARSTERS
2,587,870
OPHTHALMIC MOUNTING
Filed May 3, 1949
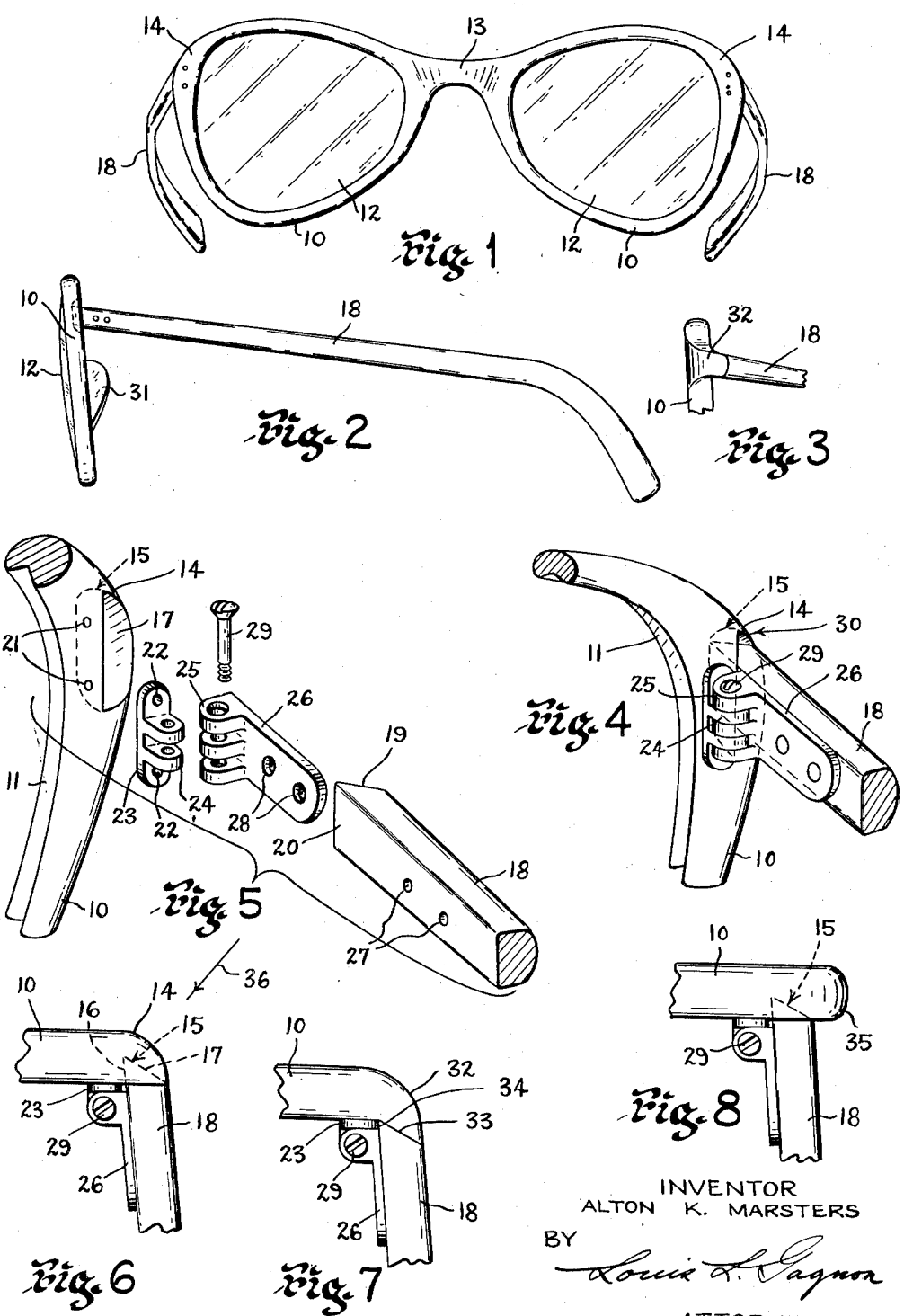
INVENTOR
ALTON K. MARSTERS
BY
Louis L. Gagnon
ATTORNEY Patented Mar. 4, 1952

2,587,870

UNITED STATES PATENT OFFICE 2,587,870

OPHTHALMIC MOUNTING

Alton K. Marsters, Southbridge, Mass., assignor to American Optical Company, Southbridge, Mass., a voluntary association of Massachusetts Application May 3, 1949, Serial No. 91,035

3 Claims. (Cl. 88—53)

This invention relates to improvements in ophthalmic mountings of the type embodying foldable temples for supporting the mounting on the face of the wearer and has particular reference to the provision of novel means and method of forming the pivotal assembly of the temples with the fronts or rims of such mountings.

One of the principal objects of the invention is to provide a novel construction and method of forming ophthalmic mountings whereby the temporal sides of the rims and the ends of the temples which are pivotally connected with the rims are so related that the respective abutting surfaces thereof, when the temples are extended, are rendered inconspicuous and substantially invisible and will readily afford a wide latitude of adjustment while retaining said characteristics.

Another object is to provide a temple and rim assembly of the above character having combined side surface and end contact with each other for increasing the strength and rigidity thereof and for more positively and durably retaining their adjusted relation during use.

Another object is to provide novel temple and rim connections adapted particularly for use with ophthalmic mountings formed of non-metallic materials whereby the outer side surfaces of the temples, when extended, will lie within the adjacent sides of the rims and the abutting surfaces thereof will be substantially invisible.

Another object is to provide a temple and rim assembly of the above character whereby the downwardly angled position and the outwardly angled position of the temples with respect to the plane of the rims may be varied while retaining the respective abutting surfaces of the rims and the ends of the temples substantially invisible when in extended position of use.

Another object is to provide a mounting of the above character wherein the horn-like projecting endpieces inherently present in most prior art mountings of this nature have been completely removed.

Another object is to provide an assembly of the above character wherein the rims are provided with recessed abutment surfaces adapted to receive and be engaged by the respective side and end surfaces of the temples and to render said engaging surfaces substantially invisible.

Another object is to provide a rim and temple assembly of the above character wherein the rim has an integral rearwardly extending portion provided with an inner angled surface adapted to be engaged by an outwardly and rearwardly angled end surface formed on the temple, said angled surfaces being such as to be substantially invisible when the rim and temple are in position of use.

Other objects and advantages of the invention will become apparent from the following description taken in connection with the accompanying drawings and it will be apparent that many changes may be made in the details of construction, arrangement of parts and the steps of the methods shown and described without departing from the spirit of the invention as expressed in the accompanying claims. I, therefore, do not wish to be limited to the exact details of construction, arrangement of parts and methods shown and described as the preferred forms only have been given by way of illustration.

Referring to the drawings:

Fig. 1 is a front elevational view of an ophthalmic mounting embodying the invention;

Fig. 2 is a side elevational view of the mounting illustrated in Fig. 1;

Fig. 3 is a fragmentary side elevational view of a modified form of the invention;

Fig. 4 is an enlarged fragmentary rear perspective view of one form of the invention;

Fig. 5 is a view generally similar to Fig. 4 showing the parts in disassembled relation with each other;

Fig. 6 is a fragmentary plan view of the construction illustrated in Figs. 4 and 5;

Fig. 7 is a top plan view of the modified construction illustrated in Fig. 3; and Fig. 8 is a view generally similar to Fig. 6 illustrating a further modification of the invention.

It has been usual in the past in forming ophthalmic mountings, particularly those of the type formed of non-metallic materials, to provide the temporal sides of the rims with integral outwardly extending lugs to which the temples were hingedly connected. The ends of the lugs and the ends of the temples were provided with abutting bevelled surfaces extending inwardly of the plane of the outer surfaces of said temples and lugs at a substantially 45° angle. These engaging bevelled surfaces were for limiting the outward pivotal movement of the temples with respect to the lugs and normally controlled what is known in the art as the setback of the temples. In order to increase the possible outward movement of the temples with respect to the lugs, it has been common practice to remove a slight amount of material from either one or the other of the bevelled surfaces.

The positions of the abutting bevelled surfaces were such that they were inherently readily visible. If great care were not exercised in removing the material from said surfaces, while adjusting the setback of the temples, undesirable spaces or gaps were formed which caused said surfaces to be more readily visible and rendered the mounting must less attractive from the esthetical viewpoint. The lugs were such that they extended outwardly as horn-like projections at the sides of the rims and caused the front of said lugs and side surfaces of the temples to form an undesirable sharp angle with each other at the line of engagement of the bevelled surfaces.

The present invention is directed particularly to overcoming the above difficulties by first removing the horn-like projections and by reversing the angle of the engaging surfaces of the rims with the ends of the temples whereby the line or break produced by the engaging surfaces is much less conspicuous and substantially invisible. This arrangement further enables the adjustment for controlling the setback of the temples to be made with greater ease and with the requirement of less accuracy for if spaces or gaps are formed they will be less visible than with prior art structures, and adjustments in general may be more readily performed without altering or affecting the appearance of the mounting.

A further feature of the present invention resides in providing the rim portions and temple ends with combined side surface and end surface contact with each other for controlling the setback or extent of outward movement of the temples with respect to the rims. This provides much greater strength and rigidity at a location which in the past has been normally weak in nature and provides a much more durable and practical structure while retaining all of the other desirable features of the invention.

Referring more particularly to the drawings wherein like characters of reference designate like parts throughout the several views, the device embodying the invention comprises a pair of lens rims 10 having inner bevelled circumferential grooves 11 adapted to receive the bevelled circumferential edges of the lenses 12 in the conventional manner. The rim members 10 are joined with each other by an integral bridge member 13 for supporting the lenses in proper spaced relation with each other. Each of the rims 10, on the temporal sides thereof, are provided with portions 14 of increased cross-sectional dimensions which, as shown particularly in Figs. 4, 5, and 6, are respectively provided with notches or recesses 15 formed in the rear surfaces thereof. The notches 15 have a side surface portion 16 and a bevelled surface 17 with which the respective adjacent side and end surfaces of the temples 18 are adapted to engage. The temples 18, as shown best in Fig. 5, are provided with a bevelled end surface 19 for engaging the surface 17, and the adjacent side surface 20 of said temples are adapted to engage with the side surface portion 16. With this arrangement, the ends of the respective temples are adapted to extend within the notches or recesses 15 whereby the engaging surface portions thereof are concealed from view.

The enlarged rim portions 14 are provided with spaced opening 21 through which suitable connecting means such as pins, screws or the like for securing the hinge member 23 thereto may be extended. The said hinge member 23 is provided with openings 22 through which said rivets are adapted to extend. The hinge member 23 is provided with spaced perforated ears 24 adapted to comate with the perforated hinge ears 25 of a hinge member 26 secured to the temple by rivets, screws or the like extending through suitable openings 27 formed in the temple and openings 28 formed in said hinge member. Suitable pivot means such as a screw or the like 29 extends through the perforated ears 24 and 25 of the hinge members for pivotally connecting said ears with each other.

The notches or recesses 15 may be formed in the rims by a suitable milling tool or may be molded therein during the forming of the rims depending upon whether or not the rim portions are blanked from sheet material and then finished to desired shape or whether they are formed by the commonly known injection molding method. If they are formed during the molding of the rims, they may be formed to the dimension of the end of the temple rather than having the outwardly extending recessed end portions 30, as shown best in Fig. 4, that is, the upper and lower portions of the recesses or notches, may be formed with end walls fitting in adjacent and relatively intimate relation with the respective upper and lower surfaces of the temples.

The rims 10, on the nasal sides thereof, are provided with suitable rearwardly extending nose pads or the like 31 for engaging the sides of the nose.

In Figs. 3 and 7, there is illustrated a slight modification of the invention wherein the rim portions 10 are provided, on the temporal sides thereof, with relatively short integral rearwardly extending lugs 32 having an outwardly and rearwardly bevelled surface 33 formed thereon with which the end bevelled surface of the temple is adapted to engage to control the outermost position or setback of the temple. The side surface 34 of the temple may or may not have side surface contact with the hinge member 23 to provide additional bearing area. This would function in a manner similar to the engagement of the side surface portions 16 with the adjacent ends of the temples, as illustrated in Fig. 6. In adjusting the setback or outermost position of movement of the temples 18 relative to the rim portions, material from the end of the temple engaging the surface 17 and material from the adjacent inner side of the temple engaging the side surface 16 may be removed as by filing, cutting or abrading. Likewise, material from the end of the temple engaging the surface 33 and the side surface 34 engaging the hinge member 23 may be removed according to the desired extent of outward angular movement of the temple with respect to the lens rims.

In Fig. 8, there is illustrated a further modification wherein the recess or notch 15, for receiving the end of the temple and for controlling the setback thereof in a manner such as described in connection with the constructions shown in Figs. 4, 5, and 6, is spaced slightly inwardly from the outer contour edge 35 of the rim.

It is particularly pointed out that when the mounting is viewed partially from the front and side or in a direction indicated by the arrow 36 in Fig. 6, there will be no visible break between the rim and temple, that is, the engaging or abutting surfaces of the rim and temple when extended will not be as visible as with most prior art mountings such as previously described above. The portion of the rims having the inner bevelled surface 17 therein or the portion 32 of the rim having the outwardly and rearwardly bevelled surface 33 thereon will function as shield-like means for concealing the abutting surfaces from view. It is quite apparent that if, during the adjustment of the setback or outermost position of movement of the temple, slight off-angular relation or the like were introduced between said abutting surfaces, the space or gap resulting therefrom is not directly visible and thereby overcomes one of the major defects of prior art mountings of this nature. Likewise, the temple may be adjusted upwardly or downwardly with respect to the plane of the lenses to vary the angle between the longitudinal axis of the temples and the planes of the rims without introducing a visible space or gap at said abutting surfaces. More of a face to face rotary movement takes place between said abutting surfaces during such adjustment rather than the opening of a gap or space between said surfaces as was the case with prior art structures.

This is also true of the construction illustrated in Fig. 8.

From the foregoing description, it will be seen that, although simple in nature, novel and ingenious means have been provided for overcoming several of the major defects of most prior art mountings as stated above and that a mounting possessing an exceptionally pleasing appearance and esthetical appeal has been created and more particularly one which will afford ease in performing all of the adjustments required by such mountings while retaining their overall general appearance.

Having described my invention, I claim:

1. A lens supporting structure for the lenses of an ophthalmic mounting, said structure comprising a central bridge and lens contour following portions on the opposed sides of the bridge with which the lenses may be mounted, said lens contour following portions each having on the rear side thereof a temple end receiving portion embodying a pair of plane-shaped abutment surfaces arranged in the form of a V, the temporally disposed abutment surface of said V being disposed to extend outwardly and rearwardly at an acute angle with respect to the general plane in which said lenses are to be mounted and the other abutment surface being approximately normal to said general plane of the lenses, pivot means carried by said lens contour following portions adjacent said temple end receiving portions, and a pair of temples pivotally secured to said pivot means for movement about an axis disposed in a substantially vertical direction and spaced rearwardly of the apex of said V and nasally of the normally disposed abutment surface of said temple end receiving portion, said temples each having an end portion beveled to coincide with the V shape of said abutment surfaces of a respective temple end receiving portion and to fit in substantially flush relation therewith when the temple is pivoted about said axis of the pivot means to its open position.

2. A lens supporting structure for the lenses of an ophthalmic mounting, said structure comprising a central bridge and lens contour following portions on the opposed sides of the bridge with which the lenses may be mounted, said supporting structure having rearwardly disposed temple end receiving means adjacent the temporal sides thereof embodying a pair of abutment surfaces arranged in substantially the form of a V, the temporally disposed abutment surface extending in an outward and rearward direction at an acute angle with respect to the general plane in which the lenses are to be mounted, and pivot means adjacent said abutment surfaces spaced rearwardly of the apex of the V and inwardly of said supporting structure relative to said abutment surfaces, and a pair of temples pivotally secured to said pivot means, said temples each having an end portion beveled to substantially fit with said abutment surfaces when the temples are pivoted to extended position.

3. A lens supporting structure for the lenses of an ophthalmic mounting, said structure comprising a central bridge and lens contour following portions on the opposed sides of the bridge with which the lenses may be mounted, temple connection means secured to the rear side of said lens contour following portions adjacent the temporal sides thereof, said temple connection means presenting a surface on their temporal side disposed substantially normal to the plane in which the lenses are to be mounted, said temple contour following portions having a rear surface portion extending in an outward and rearward direction from adjacent the forwardmost end of said normally disposed surface of the temple connection means at an acute angle with respect to the general plane in which the lenses are to be mounted to form an approximately V-shaped temple end receiving recess, and temples pivotally connected to said temple connection means for movement about a vertical axis spaced rearwardly of the apex of said V-shaped temple end receiving recess and inwardly of the supporting structure relative to said normally disposed surface, said temples each having their end portion shaped to substantially engage said abutment surfaces when the temples are pivoted to extended position.

ALTON K. MARSTERS.

REFERENCES CITED

The following references are of record in the file of this patent:

UNITED STATES PATENTS

| Number | Name | Date |
|---|---|---|
| 1,424,828 | Kirstein et al. | Aug. 8, 1922 |
| 1,570,880 | Dunkelberg | Jan. 26, 1926 |